United States Patent Office 3,549,373

Patented Dec. 22, 1970

3,549,373
NEGATIVE-TO-POSITIVE REVERSIBLE COPY SHEET

Takao Hamada, Musashino, and Tsuyoshi Morishima, Machida, Japan, assignors to Kabushiki Kaisha Ricoh, Tokyo, Japan, a corporation of Japan No Drawing. Filed Mar. 13, 1967, Ser. No. 622,458
Claims priority, application Japan, Mar. 19, 1966, 41/17,154
Int. Cl. G03c *1/52, 1/64, 1/66*
U.S. Cl. 96—75 4 Claims

ABSTRACT OF THE DISCLOSURE

A multi-layer reversible copy sheet is provided on which a positive image is obtainable from a negative original and which is characterized by its high resolution power, long shelf life, and freedom from photo-fading tendency.

BACKGROUND OF THE INVENTION (1) The field of the invention comprises diazotype printing plates or copy sheets. (2) With known lithographic printing plates having a saponaceous acetate film base on which is directly coated, on the hydrophilic surface thereof, a light-sensitive solution containing light-sensitive diazo material(s), permeation of the solution into the saponified base prevents formation of an effective light-sensitive layer thereon, causing deterioration of the ink receptivity of the plates. Attempts to improve the ink receptivity invariably call for a high density light-sensitive solution which is likely to entail lowering of light sensitivity and crystallization of the light-sensitive layer. Further, the image directly formed on such saponaceous acetate film base has poor adhesive property and comes off easily.

The silver halide or Kalvar process, wherein a positive image is obtainable from a photographic negative film, involves a complicated operation, and difficulties are encountered in obtaining desired colors for the reproduced positive image.

A primary object of the invention is to provide a negative-to-positive reversible copy sheet on which a positive image is obtainable using a negative original and which overcomes the aforementioned drawbacks.

SUMMARY OF THE INVENTION

The multi-layer reversible copy sheet described herein, which includes a diazo compound-containing light-sensitive layer and a non-metallic base, is characterized by the presence of an intermediate layer formed of a resin that is water soluble or alkali soluble and that prevents the diazo compound from being chemically affected by the surface of the base.

DESCRIPTION OF THE SPECIFIC EMBODIMENTS

A negative-to-positive reversible copy sheet according to this invention has, on its non-metallic base, an intermediate layer comprising either an alkali metal salt of a copolymer of a vinyl compound and an unsaturated organic fatty acid, or a water soluble resin, or an alkali soluble resin, said intermediate layer being further overlaid with a light sensitive layer consisting of a photochemical diazo compound. Color pigment(s) or dyestuffs can also be included in the intermediate layer.

The non-metallic base applicable in the present invention includes, for example, saponifiable synthetic resin films such as cellulose acetate film and polyethylene terephthalate film, or such resin films laminated with paper, or a transparent synthetic resin film made of resins such as polyester, polyamide, vinyl chloride and polycarbonate.

Regarding the alkali metal salt of the copolymer, the copolymer moiety is one made from a vinyl compound and an unsaturated organic fatty acid. Specific alkali metal salt copolymers include potassium salt copolymer of vinyl acetate and maleic acid, sodium salt copolymer of vinyl acetate and crotonic acid, sodium salt copolymer of vinylmethylether and maleic acid, potassium salt copolymer of styrene and anhydride of maleic acid, ammonium salt copolymer of vinyl acetate and acrylic acid, calcium salt copolymer of vinylmethylketone and itaconic acid, etc.

The aforesaid water soluble resin includes, for example, polyvinylalcohol, polyvinylpyrrolidone, carboxyl-methylcellulose, hydroxyethylcellulose, carboxymethyl-hydroxyethylcellulose. The alkali soluble resin may comprise resins having such alkali soluble groups as anhydrous group, carboxylic acid group, sulphonic acid group and sulphonamide group, such as novolak, copolymer of ethylene and maleic anhydride.

The diazo compound constituting the light sensitive layer may be broadly classified into those containing a water soluble group and those containing an organic solvent soluble group, selection of which is determined by the characteristics of the aforesaid intermediate layer. Generally, both groups are used in conjunction with a hydrophilic base, while a solvent soluble group is more recommendable when a hydrophobic base is used.

The water soluble diazo compound may embrace, for example, a diazo compound of 4-(N-2, 6-dichlorobenzene)-aminoniline, a diazo compound of paraaminodiphenylamine, a condensate of these diazo compounds and a carbonyl compound such as formaldehyde, a diazidostilbene compound such as described in (a) hereunder and a tetrazo compound such as shown in (b) below:

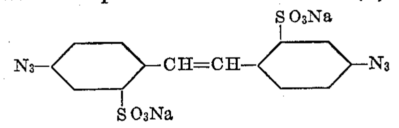

(a)

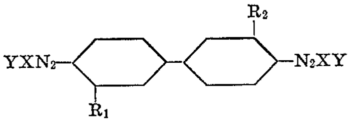

(b)

In the above structure, $R_1$ and $R_2$ represent $CH_3$, $C_2H_5$ and $OCH_3$, X indicates anions such $Cl^-$, $CO_3H^-$, $Br^-$, and Y shows double salts such as $\frac{1}{2}ZnCl_2$, $\frac{1}{2}CdCl_2$, etc.

Solvent soluble diazo compounds usable for this invention include iminodiazido sensitizers such as (c) and (d) shown hereunder, paraquinone diazido sensitizers such as (e) and (f) therebelow, and reactive derivatives of the aforesaid water soluble diazo compounds and sodium paratoluene-sulfonate.

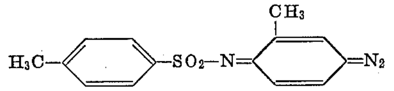

(c)

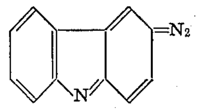

(d)

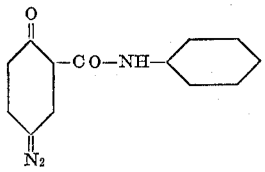

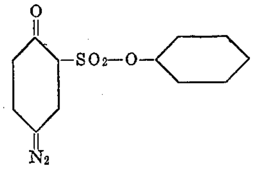

(e) (f)

These diazo compounds may be respectively used independently or in conjunction with the aforesaid water or alkali soluble resin in order to form the light sensitive layer. Color pigments useful for this invention are conventional and embrace chrome yellow, Prussian Blue, Phthalocyanine Blue, Carbonblack, Benzidine Yellow, Permanent Red, Pyrazolon Red, Phthalocyanine Green, Rhodamine B, Permanent Green, etc. Methylene Blue, Eosine and the like are useful dyestuffs. Suitable solvents for coating the intermediate and light sensitive layers are aqueous solutions or mixtures of water and water compatible organic solvents such as methylalcohol, ethylalcohol, isopropylalcohol, glycolmonomethylether, diozane, etc.

According to the invention, when a copy sheet as heretofore described is subjected to the radiation of ultraviolet rays on the light sensitive layer, on which is overlaid, in close contact therewith, a negative original, the diazo compounds in the light sensitive layer corresponding to image areas or transparent portions of the negative original are caused to solidify while the diazo compounds protected by the opaque portions corresponding to non-image areas of the negative original remain unaffected. Treating the thus exposed sheet with a suitable developing solution removes the non-image areas, leaving image areas.

Thus, the negative-to-positive reversible copy sheet according to this invention can be used as a so-called transfer film on which a positive image is formed from general photographic films or microfilms carrying a negative image or as a light sensitive lithographic plate, or as a color proof sheet for multicolor printing by obtaining a positive film from a half-tone negative for color separation.

The presence of an intermediate layer consisting of the aforesaid resins between the base material and the light sensitive layer prevents, when the copy sheet is preserved in a dark place, the photochemical diazo compounds comprised in said light sensitive layer from being chemically affected by the surface of the base material. This not only results in improvement of stability and in the preservation of the product, but also enhances the contrast between the image area and the non-image area after printing, ensuring a clear printed image.

Furthermore, the present invention has an advantage over those sheets destitute of an intermediate layer in that the image formed thereon is considerably durable due to certain reactions between the diazo compounds and the intermediate layer, which lends itself to formation of a suitable printing plate from the standpoint of running prints.

In addition, strong adhesive property of the aforesaid intermediate layer and the image area ensures prevention of side-etching phenomenon.

Another advantage of the presence of the intermediate layer is that the permeation of the sensitive solution into the base material can be kept low, which means that the formation of an effective sensitive layer having sufficient ink receptivity at the image area becomes possible even with a light sensitive solution of lower density than actually employed in the art.

Further, inclusion of pigments or dyestuffs in said intermediate layer facilitates ascertaining the extent of development, as that portion on the copy sheet which corresponds to the image area of the original distinguishes itself out from the rest after development, both the sensitive layer and the colored intermediate layer therebelow which are covered by the non-image area of the original being altogether removed during the developing process, thereby causing the surface of the base to appear. It goes without saying, however, that the product is sufficiently usable as a lithographic plate without the aforesaid pigments or dyestuffs.

In addition to economy in the manufacture of the copy sheet, the present invention provides considerable ease with which any desired color can be suitably selected for the copy sheet according to the intended usage. For example, when the copy sheet is intended to be used as an intermediate, it is sufficient to select such pigments or dyestuffs as will produce black or sepia line. For use as a colorproof sheet for a multi-color print, simply overlaying half tone negatives for color separation, exposing and then developing Brilliant Carmine 6B, Phthalocyanine Blue, Benzidine Yellow and Carbonblack, as the case may be, respectively for magenta, cyan, yellow and black colors, and overlapping them all in one suffices the need.

The fact that the developed image rarely fades also enhances the practical value of the resultant product of this invention.

For the better understanding of the invention, the following illustrative but non-limiting examples thereof are given:

EXAMPLE 1

A solution of the following composition was coated on the surface of a saponaceous acetate film base, following which it was dried by heated air of 100° C. to form an intermediate layer:

| | Parts |
|---|---|
| Potassium salt copolymer of styrene and anhydride of maleic acid | 0.5 |
| Phthalocyanine Blue | 0.8 |
| Isopropylalcohol | 20 |
| Water | 80 |

A 0.5% water soluble solution containing a condensate of diazosulfonate of para-aminodiphenylamine and formaldehyde was then coated on such intermediate layer, following which it was dried by heated air of 80° C. to form a light sensitive layer. By overlaying a negative original on the thus yielded negative-to-positive reversible copy sheet, exposing them to ultraviolet rays, and developing with water, that portion of the copy sheet which corresponds to the image area of the original turned solid and blue, while the unexposed light sensitive layer and intermediate layer corresponding to the non-image area of the original were dilated and dissolved, causing considerable contrast between the image area and the non-image area transferred on the copy sheet, thus facilitating affirmation of the extent of developing. Using this copy sheet as a printing plate, 10,000 prints were easily turned out.

EXAMPLE 2

In order to facilitate coating of the intermediate layer and the light sensitive layer on a polyester film base, a solution of the following formulation was first applied on said film base in 0.5$\mu$ thickness, following which it was dried for 3 minutes at the temperature of 120°–140° C:

| | Parts |
|---|---|
| Copolymer of crotonic acid and vinyl acetate | 5 |
| Glycolmonomethylether | 100 |

A solution of the following formulation was mixed by stirring it in a ball mill for 24 hours and then coated on the above mentioned layer and dried in the same manner as in Example 1 to form an intermediate layer:

| | Parts |
|---|---|
| Copolymer of styrene and sodium maleic anhydride | 2 |
| Phthalocyanine Blue | 2 |
| Ethylene glycol | 10 |
| Nonion activator | 0.5 |
| Isopropylalcohol | 15 |
| Water | 80 |

A light sensitive layer was formed on the above mentioned intermediate layer by coating thereon a solution of the following composition and drying it by heated air of 80° C.:

| | Parts |
|---|---|
| Tetrazo compound of orthotolidine | 2 |
| Polyacrylamide | 4 |
| Saponin | 0.1 |
| Water | 100 |

By overlaying a negative microfilm on the resultant product, exposing them to ultra-violet rays, and developing with running water or a wetted sponge, the light sensitive layer and the intermediate layer corresponding to the nonimage area of the microfilm were dissolved in water, leaving a clear blue image on a transparent film of the product. This is usable as a positive microfilm.

EXAMPLE 3

The procedure of Example 1 was followed to form the intermediate layer of the following formulation on a paper base of strong wet strength laminated with a saponaceous acetate film:

| | Parts |
|---|---|
| Sodium salt copolymer with vinyl acetate and crotonic acid | 2 |
| Permanent Yellow | 1 |
| Ethylalcohol | 50 |
| Water | 50 |

0.2% water soluble solution of diazo resin #4 (made by Fairmont U.S.A.) was then coated thereon and dried following the same procedure of Example 1.

By exposing to ultra-violet rays the resultant negative-to-positive reversible copy sheet overlaid with a photographic negative original, and then developing the former sufficiently in a lacquer emulsion image developer, the fat component of said lacquer emulsion adhered on the light solidifiable portion of the copy sheet corresponding to the image area of the original while the intermediate layer and the sensitive layer corresponding to the non-image area thereof were removed. The non-image area transferred onto the copy sheet was then desensitized with arabic gum solution containing phosphoric acid, which then immediately rendered said copy sheet usable as an offset printing plate good for a 10,000 sheet run.

EXAMPLE 4

As an intermediate layer, a mixed solution of water and alcohol containing 2% sodium salt of a copolymer of vinylmethylether and maleic anhydride was coated on a water resistant paper having a water-insoluble hydrophilic surface. Then the same light sensitive layer as in Example 1, was applied thereon.

Yield: same printing capacity as in Example 1 was observed using the resultant negative-to-positive copy sheet as a printing plate.

EXAMPLE 5

Following application of the same precoating layer as in Example 2 on a polycarbonate film base, an intermediate layer of the following formulation was coated thereon:

| | Parts |
|---|---|
| Novolak resin | 25 |
| Pigment Green | 2 |
| Ethylene glycol | 5 |
| Nonionic activator | 0.5 |
| 2.8% aqueous ammonia | 4.5 |
| Isopropylalcohol | 15 |
| Water | 80 |

The purpose of adding the aqueous ammonia was to dissolve the novalak resin and after drying the above coated solution for 3 minutes at the temperature of 110°–130° C., ammonia was removed from said layer leaving no alkaline ingredient.

A light sensitive solution composed of 2 parts of N-(4′-methylbenzene-1-sulfonyl)-imino-(1)-2-methylbenzoquinone-(1,4)-diazido-(4) and 100 parts of glycolmonomethylether was then coated on the above.

Using the resultant sheet in conjunction with a negative microfilm, a clear green positive image was formed on a transparent sheet.

EXAMPLE 6

The surface of a polyethylene terephthalate film was first saponified with potassium hydroxide aqueous solution, following which it was coated with a solution comprising 1% ammonium salt of a copolymer of vinyl acetate and acrylic acid and 0.5% Rhodamine B to form the intermediate layer. Coated over the latter was 0.1% of the same diazo compound as in Example 1 which was dried thereafter.

This yielded a copy sheet useful as lithographic printing plate of small stretching and contracting property which was good for a 5,000 sheet run.

EXAMPLE 7

The surface of a cellulose acetate film was saponified with alkali solution consisting of 8 parts of caustic soda, 0.1 part of nonionic activator and 100 parts of water, and then on it was coated an intermediate layer of the following formulation:

| | Parts |
|---|---|
| Carboxymethylhydroxyethylcellulose | 2.0 |
| Carbon black | 1.5 |
| Ethylene glycol | 10 |
| Nonionic activator | 0.5 |
| Isopropylalcohol | 15 |
| Water | 80 |

Following the above procedure, a light sensitive solution comprising 2 parts of a condensate of para-diazodiphenylamine and formaldehyde, 0.1 part of saponin and 100 parts of water was then coated on the intermediate. By treating the product sheet in the same manner as described in Example 2, a black positive image was formed on a transparent film base.

We claim:

1. In a reversible copy sheet on which a positive image is obtainable from a negative original, wherein said sheet comprises a non-metallic base, an intermediate layer on said base, and a light-sensitive diazo compound-containing layer on said intermediate layer, the improvement wherein said intermediate layer is formed of a resin that comprises a water-soluble alkali metal salt of a copolymer of a vinyl compound and an unsaturated organic carboxylic acid, said resin, when said copy sheet is stored in a dark place, preventing said diazo compound from being chemically affected by the surface of said base, said copy sheet, after exposure with a negative original to form an image, being developable with an aqueous developing solution which dissolves non-image areas of said intermediate and light-sensitive layers, and said copy sheet being characterized by having high resolution power, long shelf life, and freedom from photo-fading.

2. Copy sheet of claim 1 wherein said vinyl compound is selected from vinyl acetate, vinylmethylether, styrene, and vinylmethylketone, and said unsaturated acid is selected from maleic acid, maleic acid anhydride, acrylic acid, and itaconic acid, and also crotonic acid.

3. Copy sheet of claim 1 wherein said copolymer is selected from copolymers of vinyl acetate and maleic acid, vinyl acetate and crotonic acid, vinylmethylether and maleic acid, styrene and maleic acid anhydride, vinyl acetate and acrylic acid, vinylmethylketone and itaconic acid, and vinylmethylether and maleic acid anhydride.

4. Copy sheet of claim 1 wherein said intermediate layer incorporates a conventional coloring agent.

References Cited

UNITED STATES PATENTS

| | | | |
|---|---|---|---|
| 2,667,415 | 1/1954 | Neugebauer et al. | 95—5.4 |
| 2,729,562 | 1/1956 | Zemp | 95—7 |
| 2,772,972 | 12/1956 | Herrick et al. | 96—33 |
| 3,130,051 | 4/1964 | Herrick et al. | 96—49 |
| 3,373,021 | 3/1968 | Adams et al. | 96—33 |

NORMAN G. TORCHIN, Primary Examiner

W. H. LOUIE, Jr., Assistant Examiner

U.S. Cl. X.R.

96—33, 91